United States Patent
Kishita

(10) Patent No.: US 8,752,067 B2
(45) Date of Patent: Jun. 10, 2014

(54) CONTROL APPARATUS, CONTROL METHOD AND STORAGE MEDIUM

(75) Inventor: Yuri Kishita, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 481 days.

(21) Appl. No.: 13/003,690

(22) PCT Filed: Jul. 29, 2009

(86) PCT No.: PCT/JP2009/003583
§ 371 (c)(1),
(2), (4) Date: Jan. 11, 2011

(87) PCT Pub. No.: WO2010/013462
PCT Pub. Date: Feb. 4, 2010

(65) Prior Publication Data
US 2011/0107349 A1    May 5, 2011

(30) Foreign Application Priority Data
Jul. 30, 2008    (JP) .................... 2008-196519

(51) Int. Cl.
*G06F 3/00*    (2006.01)
(52) U.S. Cl.
USPC ........................... 719/313; 719/311; 719/328
(58) Field of Classification Search
CPC .......... H04N 21/4622; H04N 21/4431; H04N 21/482; H04N 21/8545; H04N 21/42204; H04N 21/4227; H04N 21/4312; H04N 21/4316; H04N 21/47; H04N 21/485; H04N 21/43615; H04N 21/43622; H04N 21/8173
See application file for complete search history.

(56) References Cited

U.S. PATENT DOCUMENTS

| | | | |
|---|---|---|---|
| 7,546,602 B2 * | 6/2009 | Hejlsberg et al. ............. | 719/313 |
| 2001/0025216 A1 | 9/2001 | Nishimura et al. | |
| 2004/0128037 A1 | 7/2004 | Miyamoto et al. | |
| 2005/0091672 A1 * | 4/2005 | Debique et al. ............... | 719/328 |
| 2005/0267979 A1 * | 12/2005 | Bailey ........................... | 709/230 |
| 2006/0111825 A1 | 5/2006 | Okada et al. | |
| 2007/0088710 A1 * | 4/2007 | Song et al. ..................... | 707/10 |
| 2008/0068144 A1 | 3/2008 | Sato | |
| 2008/0235712 A1 * | 9/2008 | Reed et al. .................... | 719/328 |

FOREIGN PATENT DOCUMENTS

JP    A-10-40080    2/1998
(Continued)

OTHER PUBLICATIONS

"Contributions to middleware architectures to prototype distribution infrastructures", Hugues, 2003, pp. 1-8.*
"Droopi: Towards a generic middleware", Thomas Quinot, 2001, pp. 1-27.*

(Continued)

*Primary Examiner* — Tuan Dao
(74) *Attorney, Agent, or Firm* — Oliff PLC

(57) ABSTRACT

A middleware layer based on a middleware program is provided between a platform layer and an application layer. In the middleware layer, an interface on the application layer side is selectable, and also an interface on the platform layer side is selected. Further, functions in the middleware layer are configured as functional modules so that they are selectable according to a function on the application layer side and a function on the platform layer side.

10 Claims, 7 Drawing Sheets

(56) References Cited

FOREIGN PATENT DOCUMENTS

| | | |
|---|---|---|
| JP | A-2001-270399 | 10/2001 |
| JP | A-2004-192541 | 7/2004 |
| JP | A-2004-348397 | 12/2004 |
| JP | A-2004-536391 | 12/2004 |
| JP | A-2005-339029 | 12/2005 |
| JP | A-2006-142994 | 6/2006 |
| JP | A-2006-260404 | 9/2006 |
| JP | A-2006-327216 | 12/2006 |
| JP | A-2007-128432 | 5/2007 |
| JP | A-2007-329578 | 12/2007 |
| JP | A-2008-074124 | 4/2008 |
| WO | WO 03/001366 A1 | 1/2003 |

OTHER PUBLICATIONS

Yamamichi et al., "Network Element Architecture based on Networking Architecture Concepts", *The technical research report by the electronic information and communication academy*, vol. 94 and 540, pp. 99-104, Mar. 15, 1995 (w/Abstract & partial translation).

Futami et al., "OKITAC-2500 General Purpose Terminal model B, C, E", *The feature of banking system*, vol. 64-3, pp. 41-46, Jul. 1, 1997 (w/Abstract & partial translation).

Mar. 29, 2011 Office Action issued in Japanese Patent Application No. 2008-196519 (with partial translation).

International Search Report issued in Application No. PCT/JP2009/003583; Dated Sep. 1, 2009.

\* cited by examiner

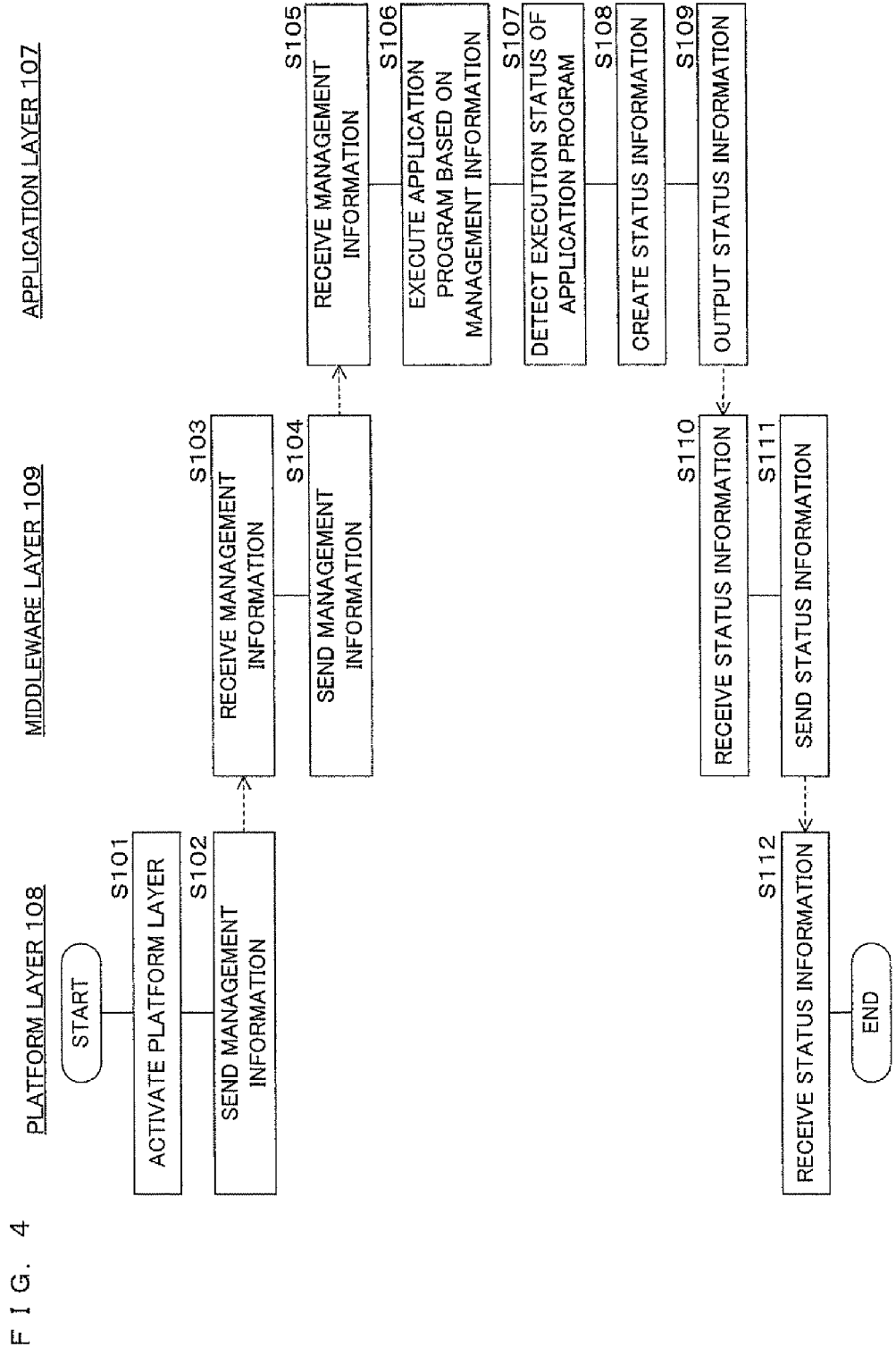
F I G. 4

CONTROL APPARATUS, CONTROL METHOD AND STORAGE MEDIUM

This application is the national phase under 35 U.S.C. §371 of PCT International Application No. PCT/JP2009/003583, which has an International filing date of Jul. 29, 2009 and designated the United States of America.

BACKGROUND

1. Technical Field

The present invention relates to a control apparatus for executing an application program and a platform program. The present invention relates more particularly to a control apparatus, a control method and a computer program capable of working flexibly with various combinations of application programs and platform programs and improving the reusability of application programs and platform programs to shorten the development process and reduce the development burden.

2. Background Art

In recent years, there has been used in various fields a system in which a plurality of control apparatuses for implementing various controls are provided with communication functions, connected to each other, and assigned respective functions to mutually exchange data and perform a variety of processes in cooperation with each other. For example, in the field of vehicle-mounted LAN (Local Area Network) provided in vehicles, an ECU (Electronic Control Unit) has a communication function, and respective ECUs are controlled to perform specific processes and exchange data with each other to implement a variety of functions as a system (see Japanese Patent Application Laid-Open No. 2007-329578.

In the case where a plurality of control apparatuses perform a variety of processes in cooperation with each other, the respective control apparatuses may be configured to implement similar functions and substitute for each other to perform functions according to settings, instead of providing each control apparatus with a specific function. More specifically, common functions are separated from application programs, which enable the respective control apparatuses to perform specific functions, so that the common functions are implemented by a platform program. Examples of the common functions include storing and updating of data for use in executing the application programs, and a communication process with other apparatus.

Therefore, when the definitions of communication specifications have changed, the platform program is modified, and all the control apparatuses are arranged to execute the modified platform program. In this case, there is no need for the application programs to be compatible with the modified communication specifications, and communications with other control apparatuses are implemented by the same process performed until then. Thus, it is not necessary to perform complicated management, such as preparing various versions of application programs compatible with different hardware. Since it is just necessary to configure application programs to purely implement specific functions, the reusability of the programs is improved.

SUMMARY

However, the structures of platform programs largely vary depending on different hardware resources or different manufactures. The definitions of functions to be included in platform programs vary. For example, in one case a trouble detection function on a communication line among communication functions is configured to be implemented by a platform program, while in other case the trouble detection function is designed to be implemented by an application program.

There is a case where in order to implement control using a specific hardware resource, a platform program specialized for the hardware resource needs to be used. Since a communication function is implemented by a platform program, there is no need to design application programs according to a difference in hardware resources. However, for different platform programs, it is finally necessary to arrange application programs to be compatible with each platform program. In this case, the complexity in developing both application programs and platform programs is not reduced, and thus it is difficult to shorten the development process and reduce the development burden.

The present invention has been made to solve the above problem, and it is a principle object of the invention to provide a control apparatus, a control method and a computer program that work flexibly with various combinations of application programs and platform programs and improve the reusability of application programs and platform programs for implementing unique functions of apparatuses to achieve a shortening of the development process and a reduction in the development burden.

A control apparatus according to a first aspect is a control apparatus comprising first execution means for executing one or a plurality of application programs, and second execution means for executing a platform program for controlling an operation of a hardware resource in accordance with a request from the application program, characterized by further comprising third execution means for executing a middleware program for transferring data between the application program and the platform program according to the application program and the platform program, wherein the third execution means includes a plurality of functional execution means.

A control apparatus according to a second aspect is characterized in that the third execution means selects and executes the plurality of functional execution means according to the application program or the platform program.

A control apparatus according to a third aspect is characterized in that the third execution means includes: for a plurality of different application programs, application associating means for transferring data to/from the application program, respectively; and for a plurality of different platform programs, platform associating means for transferring data to/from the platform program, respectively, and selects the application associating means and the platform associating means in accordance with the application program and the platform program to be executed.

A control apparatus according to a fourth aspect is characterized in that, with a process of the middleware program, the third execution means includes: means for selecting data to be delivered sent to the application program among data from the platform program; and means for selecting an output destination in the platform program for data when delivering sending the data from the application program to the platform program.

A control apparatus according to a fifth aspect is characterized in that, with a process of the middleware program, the third execution means includes means for transferring information indicating the application program to be executed by the first execution means, information identifying the application program being executed by the first execution means, or status information about the application program executed by the first execution means, to/from the first execution means or the second execution means.

A control apparatus according to a sixth aspect is characterized by further comprising: means for instructing the first execution means to execute the application program, the second execution means to execute the platform program, and the third execution means to execute the middleware program; and means for detecting an execution status of the application program being executed by the first execution means, an execution status of the platform program being executed by the second execution means, and an execution status of the middleware program being executed by the third execution means.

A control method according to a seventh aspect is a control method for controlling a hardware resource by executing one or a plurality of application programs and executing a platform program for controlling an operation of the hardware resource in accordance with a request from the application program, the method being characterized by comprising: executing a middleware program for transferring data between the application program and the platform program according to the application program and the platform program; and selecting a function to be executed by the middleware program, according to the application program or the platform program.

A computer program according to an eighth aspect is a computer program for causing a computer to execute transfer of data between one or a plurality of application programs and a platform program for controlling an operation of a hardware resource in accordance with a request from the application program, according to the application program and the platform program, wherein the computer program includes a plurality of program components separated into predetermined function units, and causes a computer to select the plurality of program components according to the application program or the platform program.

In the first and seventh aspects, a middleware program that transfers data between an application program and a platform program according to each of the programs is executed. Furthermore, with the middleware program, a plurality of functions is respectively executable. It is thus possible not only to perform data transfer according to a combination of an application program and a platform program to be executed, but also to select various functions to be implemented by the middleware program.

In the second and eighth aspects, functions are selected according to various combinations of application programs and platform programs by a single middleware program. For example, one application program is configured on the premise that a platform program has a predetermined function. However, even if a platform program to be combined does not have the predetermined function, the function is implemented by the middleware program, and therefore the application program is operated without causing any problems. Hence, there is no need to modify application programs individually according to different platform programs, and the application programs are reusable with a variety of platform programs.

In the third aspect, interfaces (associating means) for implementing data transfer according to different programs, respectively, are prepared for data transfer to/from an application program and data transfer to/from a platform program, respectively. Therefore, the interfaces are selectable or changeable according to various combinations of application programs and platform programs. Thus, since the control apparatus works flexibly with various combinations of programs, including a combination with a platform program which is not supposed on the application program side, the application programs are reusable with a variety of platform programs.

In the fourth aspect, when data are outputted from a platform program to an application program, necessary data is selected and sent to the application program by a process of the middleware program. For data from the application program to the platform program, an output destination in the platform program is selected and sent by a process of the middleware program. Therefore, even if there is no compatibility in data transfer between the application program and the platform program, appropriate selection and adjustment are made. The application program side obtains data according to the application program irrespectively of which platform program is used, and thus the application program is reusable with a variety of platform programs.

Further, in the fifth aspect, with a process of the middleware program, it is possible to specify an application program to be executed, or notify the platform program side of the application program being executed, or an execution status of the application program. Some platform programs may have functions to be implemented on the application program side. There is also a case where the application program has functions to be implemented on the platform program side depending on the state of the application program. The processes of the middleware program enable both the application program and the platform program to obtain information from each other, and the control apparatus is able to work with various combinations of application programs and platform programs.

In the sixth aspect, it is further possible to change the execution of an application program and a platform program and the execution of a middleware program for implementing various combinations of application programs and platform programs, according to various conditions of the entire control apparatus. Since the status of each of the programs is detectable with respect to the respective execution means, it is possible to perform the process of selecting functions in the middleware program according to the application program. This allows various combinations of application programs and platform programs to be implemented properly.

In this invention, since the middleware program implements data transfer between an application program and a platform program according to various combinations of application programs and platform programs, there is no need to adjust application programs according to different platform programs. Moreover, since functions to be implemented by the middleware program are selectable according to a combination of an application program and a platform program, missing or overlapping functions are mutually adjusted by the middleware program. Hence, even if a different platform program is used, there is no need to adjust application programs individually, thereby achieving a shortening of the development process for both application programs and platform programs.

The above and further objects and features will more fully be apparent from the following detailed description with accompanying drawings.

BRIEF DESCRIPTION OF DRAWINGS

FIG. 4 is a flowchart illustrating one example of a process executed in the application layer, the platform layer and the middleware layer, according to functions of a system manager.

DETAILED DESCRIPTION

The following description will explain specifically the present invention with reference to the drawings illustrating an embodiment thereof.

The following embodiment is explained by way of an example in which a control apparatus according to the present invention is applied to an ECU (Electronic Control Unit) mounted in a vehicle to implement various controls.

Figure 1:
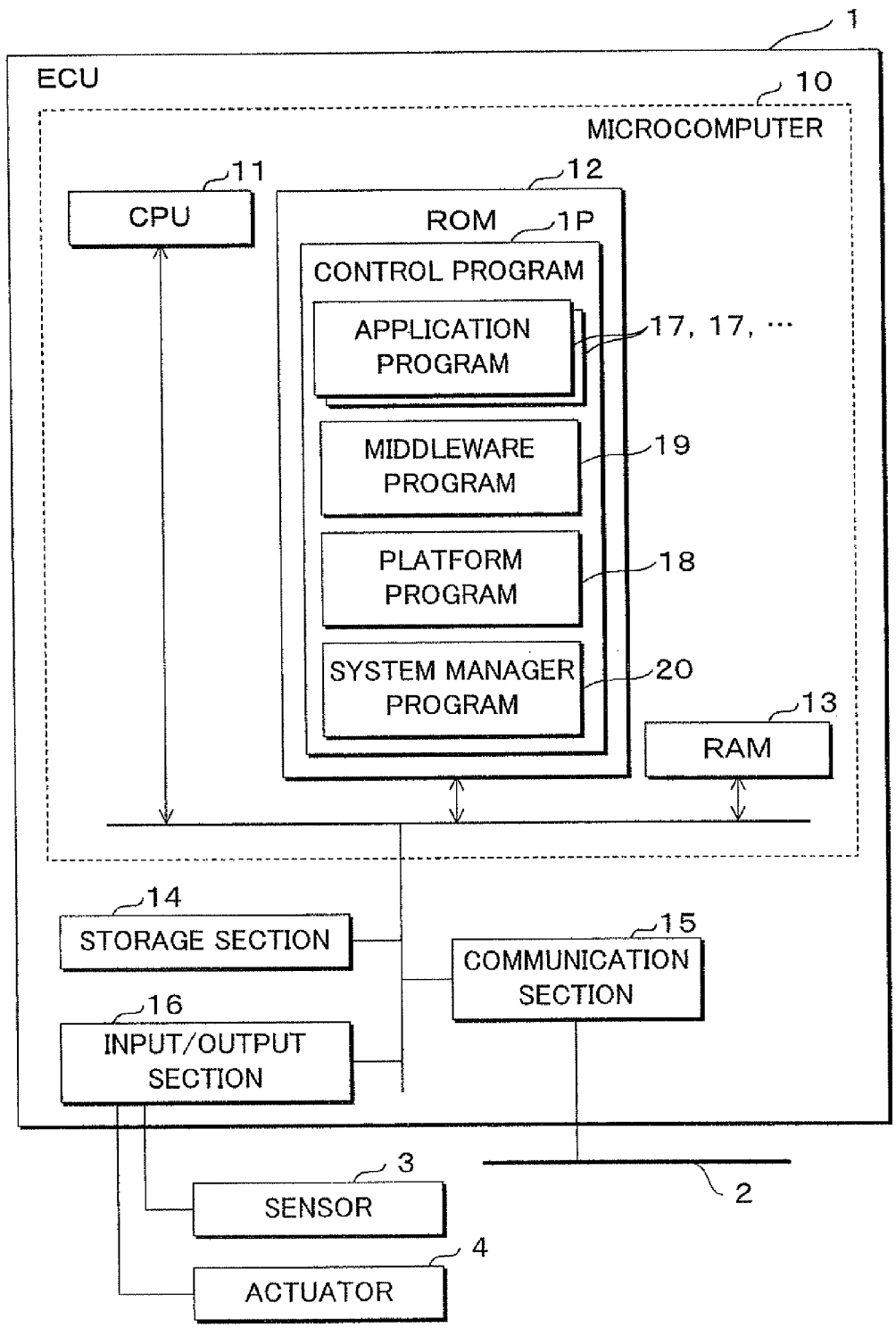
FIG. 1 is a block diagram illustrating the configuration of an ECU according to this embodiment.

FIG. 1 is a block diagram illustrating the configuration of an ECU according to this embodiment. An ECU 1 is connected to other ECU through a communication line 2 to communicate with each other. Moreover, a sensor 3 and an actuator 4 are connected to the ECU 1. The ECU 1 has unique functions, such as performing its own process based on information obtained from the sensor 3, or activating the actuator 4 based on information obtained from a process performed by other ECU. Although both of the sensor 3 and actuator 4 are connected to the ECU 1, it may be possible to connect only one or none of them to the ECU 1.

The ECU 1 comprises: a microcomputer 10 including a CPU (Central Processing Unit) 11 for controlling the operations of respective component parts, a ROM 12 using a non-volatile memory, and a RAM 13 using a memory accessible at high speeds (hereinafter referred to as the microcomputer 10); a storage section 14 using a non-volatile memory; a communication section 15 using a network controller; and an input/output section 16 as an interface to the sensor 3 and the actuator 4.

The storage section 14 is configured with a relatively large storage capacity by using a memory, such as a flash memory and an EEPROM (Electrically Erasable and Programmable ROM). The storage section 14 stores information obtained from processes performed when the microcomputer 10 executes later-described application programs 17, 17 . . . , for example, system information, such as the status information about the ECU 1, and the status information about a vehicle in which the ECU 1 is mounted. Additionally, the storage section 14 stores data that the microcomputer 10 obtained from the sensor 3, data received from other ECU etc.

The communication section 15 implements communication with the microcomputer 10 and other ECU through the communication line 2. More specifically, the communication section 15 implements communication according to protocols, such as CAN (Control Area Network), LIN (Local Interconnect Network), or FlexRay (registered trademark). The communication section 15 may be configured as a part of the microcomputer 10.

The input/output section 16 is an interface to the sensor 3 and the actuator 4 as described above. When the sensor 3 is connected to the input/output section 16, the input/output section 16 extracts a signal indicating a measurement value etc. outputted from the sensor 3 and outputs the signal to the microcomputer 10. When the actuator 4 is connected to the input/output section 16, the input/output section 16 outputs a control signal for the actuator 4 outputted from the microcomputer 10 to the actuator 4. The input/output section 16 may have a D/A conversion function and an A/D conversion function.

The CPU (Central Processing Unit) 11 of the microcomputer 10 controls the respective component parts and implements unique functions by retrieving a control program 1P stored in the ROM 12 into the RAM 13 and executing it.

The ROM 12 uses a memory, such as a mask ROM, a flash memory, a PROM (Programmable ROM), an EPROM (Erasable and Programmable ROM), and an EEPROM (Electrically EPROM). The ROM 12 may store not only the control program 1P as described above, but also control data for controls.

The RAM 13 uses a memory, such as a DRAM (Dynamic Random Access Memory), and an SRAM (Static Random Access Memory). The RAM 13 temporarily stores various kinds of information generated in the processes performed by the CPU 11.

The control program 1P stored in the ROM 12 includes: application programs 17, 17, . . . for allowing the microcomputer 10 to execute processes unique to the ECU 1; a platform program 18 including various types of programs for implementing common functions with other ECU, such as control of hardware resources and a communication function; a middleware program 19 for mediating communication between the application programs 17, 17, . . . and the platform program 18; and a system manager program 20 for controlling processes based on the respective programs as the entire ECU 1.

The application programs 17, 17, . . . include various programs for enabling the ECU 1 to implement unique functions, such as a program for implementing a process for controlling a vehicle engine, and a program for implementing a process for switching door lock between on and off and headlights between on and off.

The platform program 18 includes programs for implementing processes on respective hardware resources in respond to processing requests for the hardware resources from the microcomputer 10 based on the application programs 17, 17, . . . , such as writing data into the storage section 14, retrieving data from the storage section 14, and sending data through the communication section 15. More specifically, the platform program 18 includes a device driver for implementing logical data access according to a processing request from the CPU 11 executing the application programs 17, 17 . . . , and a BIOS (Basic Input/Output System) for implementing physical data access based on the respective hardware resources mounted.

The middleware program 19 includes a program for implementing an interpreter function for converting processing requests from the application programs 17, 17 . . . to correspond to the platform program 18 and sending them to the platform program 18. More specifically, the middleware program 19 includes an output-system processing function for receiving an output request from the CPU 11 based on the application programs 17, 17, . . . , for example, a request to write data into the storage section 14, and a send request from the communication section 15, and sending the data according to the platform program 18. The middleware program 19 also includes an input-system processing function for receiving data inputted from the platform program 18, converting the data into a form interpretable by the application programs 17, and sending the data to the application programs 17, 17 . . . . Furthermore, the middleware program 19 implements a management system processing function for implementing the function of passing management information sent from the CPU 11 based on a later-described system manager program 20 to the application programs 17, 17 . . . .

Each of the output-system processing function, input-system processing function and management-system processing function included in the middleware program 19 is configured to be individually selectable as an independent functional module. In other words, the middleware program 19 is configured so that when the CPU 11 performs processing based on the middleware program 19, even if it executes the middleware program 19 while deleting a functional module that implements an unnecessary function, the CPU 11 performs processing without causing any problems. Moreover, since each of the functional modules is configured to be able to be included in the application program 17 or the platform program 18, it is possible to compensate for missing functions in the application program 17. More specifically, the middleware program 19 is composed of an object-oriented software program, and the functional modules are designed as separate object units, and therefore various functions are selectable by selecting objects and creating an execution file.

The system manager program 20 is a program for controlling processes based on application programs 17, 17, . . . to be executed by the CPU 11, a process based on the platform program 18, a process based on the middleware program 19, and a process based on the system manager program 20 as a whole according to the status of functions to be performed by the ECU 1. For example, the system manager program 20 implements the function of switching processes based on the respective programs, according to a difference in the status, such as whether the ECU 1 should performs an operation for a test stage before shipment, an operation to be performed during running, or an operation to be performed during maintenance. Alternatively, the system manager program 20 implements the function of switching processes based on the respective programs, according to whether the ECU 1 should correspond to a vehicle with specifications for Japan, or a vehicle with specifications for North America. For example, the system manager program 20 implements the function of changing the physical control method for hardware resources, according to the application programs 17, 17 . . . being executed.

Figure 2:
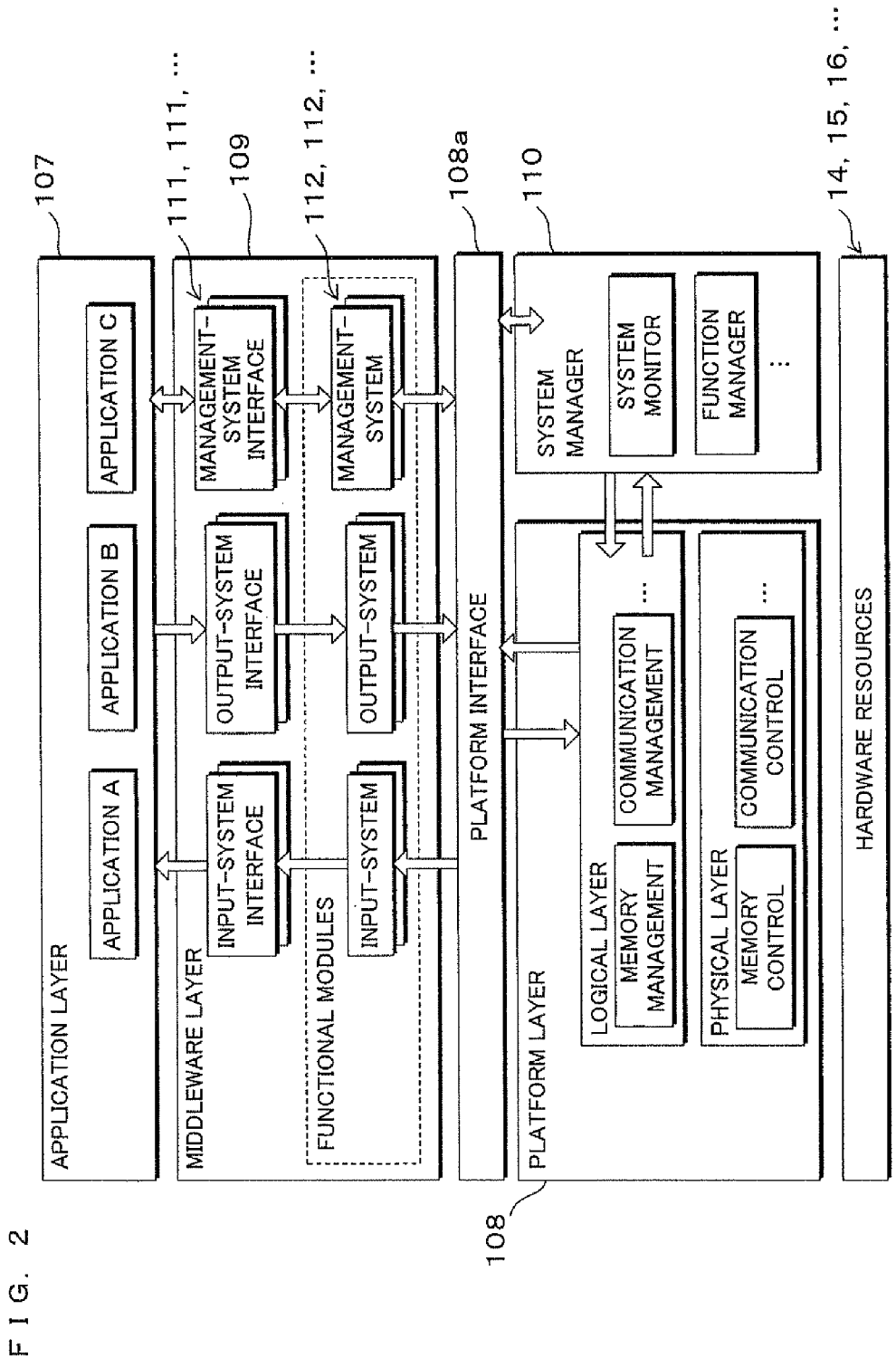
FIG. 2 is an explanatory view conceptually illustrating functions implemented by a CPU of the ECU according to this embodiment.

FIG. 2 is an explanatory view conceptually illustrating functions to be implemented by the CPU 11 of the ECU 1 according to this embodiment. The CPU 11 (a first execution section, a second execution section, a third execution section, an instructing section and a detecting section) retrieves the control program IP stored in the ROM 12 into the RAM 13 and executes the control program 1P. As described above, the control program 1P includes the application programs 17, 17 . . . ,the platform program 18, the middleware program 19, and the system manager program 20. The CPU 11 operates in the software structure composed of separate three layers, namely an application layer 107, a middleware layer 109, and a platform layer 108, based on each program included in the control program 1P.

In the topmost application layer 107, the CPU 11 functions as various applications (Application A, Application B, and Application C . . . ) based on the application programs 17, 17 . . . .

In the middleware layer 109 as an intermediate layer, the CPU 11 executes a plurality of functional modules 112, 112 . . . for receiving processing requests from the respective applications in the application layer 107, or for transferring data from the platform layer 108 to the application layer 107, based on the middleware program 19. It is possible to select functional modules 112, 112 . . . to be executed according to the application programs 17, 17 . . . executed in the application layer 107, or the platform program 18 executed in the platform layer 108. In the functional modules 112, 112 . . . , it is possible to switch data input and output methods according to a platform interface 108a of the platform program 18 executed in the platform layer 108. In the middleware layer 109, a plurality of interfaces 111, 111 . . . corresponding to various application programs 17, 17 are implemented based on the middleware program 19. It is possible to switch the calling method, data transfer method etc. according to the application programs 17, 17 . . . executed in the application layer 107.

In the lowest platform layer 108, the CPU 11 performs the process of actually controlling a plurality of hardware resources 14, 15, 16 . . . based on the platform program 18. For example, the CPU 11 implements functions, such as writing and reading data into/from the storage section 14, and sending and receiving data to/from the communication section 15. In this embodiment, the functions in the platform layer 108 are further divided inside hierarchically into a logical layer for executing logical access, such as which data is to be retrieved from the storage section 14, and a physical layer for executing physical access, such as actually writing data to be sent to an I/O memory in the communication section 15.

Furthermore, when the CPU 11 retrieves and executes the system manager program 20, the function of the system manager 110 is implemented by sharing an interface with the platform layer 108. The system manager 110 implements a system monitor function for detecting in three layers the execution status of various applications functioning in the application layer 107, the execution status of the functional modules in the middleware layer 109 corresponding to the applications executed, and the presence of hardware resources in the platform layer 108 and retaining the information, and implements a function manager for indicating a type, location and grade of a vehicle in which the ECU 1 is mounted and applications, functional modules 112, 112, . . . to be implemented and hardware resources 14, 15, 16, . . . to be activated in the respective layers according to switching of functions of the ECU 1. Note that the system manager 110 may be configured not only to share an interface with the platform layer 108 as illustrated in FIG. 2, but also to directly send and receive information to/from the functions of the respective layers.

Examples of applications functioning in the application layer 107 include signal control, condition determination, and load control for controlling a load (such as an actuator 4). The application programs 17, 17 . . . to be executed in the application layer 107 are determined based on management information sent from the system manager 110 through the functional module 112 of a management system of the middleware layer 109. For example, the CPU 11 retrieves the management information from the middleware layer 109 based on a specific application program 17 executed in the application layer 107, selects other application programs 17, 17 . . . to be executed based on the management information, and executes them. The management information includes, for example, information indicating the state or status of the ECU 1, and information identifying the application programs 17, 17 . . . to be executed according to the state or status of the ECU 1. For example, the management information includes information indicating that the ECU 1 is in the test stage before shipment, and information identifying the application programs 17, 17 . . . to be executed in this case. It is thus possible to perform a process according to the status, such as selecting and executing an appropriate application program 17 based on the management information in the application layer 107.

An example of the functional module 112 functioning in the middleware layer 109 is a relay function of the input system for receiving and sending information obtained from the platform layer 108 to an application functioning in the application layer 107. With the relay function of the input system, the CPU 11 sends information required by an application functioning in the application layer 107 among information obtained from the platform layer 108. Other example is a relay function of the output system for sending data outputted from the application functioning in the application layer 107 to the platform layer 108. With the relay function of the output system, the CPU 11 selects an output destination in the platform layer 108, according to the use of the information outputted from the application functioning in the application layer 107, and calls an appropriate interface from the platform interface 108a and sends it.

For example, in the case where the information outputted from the application is data that is to be sent to an external apparatus, an output destination is selected by calling an appropriate interface from the platform interface 108a so that the data is sent from communication hardware according to an appropriate communication protocol by the function of the functional module 112 of the output system corresponding to the platform layer 108. In the case where the information outputted from the application is a control signal for the actuator 4, an interface for accessing hardware corresponding to the actuator 4 is appropriately selected by the function of the functional module 112 of the output system.

Figure 3:
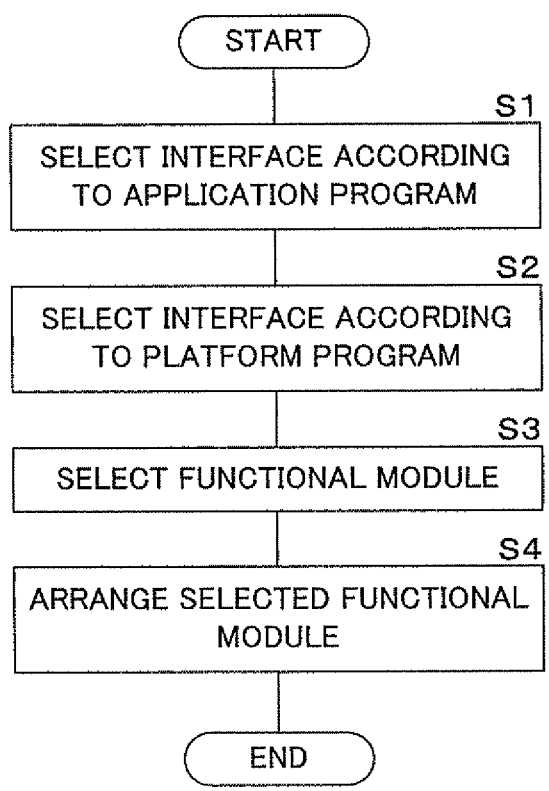
FIG. 3 is a flowchart illustrating one example of a process in which interfaces and functions are executed according to an application layer and a platform layer based on a middleware program.

FIG. 3 is a flowchart illustrating one example of a process in which interfaces and functions are executed according to the application layer 107 and the platform layer 108 based on the middleware program 19. This process is executed by a compiler etc. when linking the application programs 17, 17 . . . , the middleware program 19, and the platform program 18.

As described above, the middleware program 19 prepares a plurality of interfaces 111, 111 . . . for implementing the calling method and transfer of data according to specification requirements of various application programs 17, 17 . . . . Thus, an interface 111 according to application programs 17, 17 . . . to be executed is selected (step S1).

With the middleware program 19, data input and output methods corresponding to the specifications of the platform program 18 to be executed in the platform layer 108 are switchable by selecting an interface. Hence, an interface according to the specifications of the platform program 18 is selected (step S2).

Then, functional modules 112, 112 . . . according to the application programs 17, 17 . . . and the platform program 18 to be executed are selected (step S3). There are functions to be executed in the application layer 107, or functions to be executed in the platform layer 108. The selected functional modules 112, 112 . . . are arranged so that they are executed in the application layer 107 or the platform layer 108 (step S4), and the process is completed.

Next, a process to be implemented by a function as the system manager 110 of the CPU 11 will be explained. FIG. 4 is a flowchart illustrating one example of a process to be executed in the application layer 107, the platform layer 108, and the middleware layer 109, according to the function of the system manager 110. The process explained below is performed, for example, when the ECU 1 is reset.

When the ECU 1 is reset and the CPU 11 is reset, the platform layer 108 is activated (step S101), and management information is created and sent to the middleware layer 109 through the platform interface 108a by the system manager 110 which is activated together with the platform layer 108 (step S102).

In the middleware layer 109, the management information is received with a notification given from the platform interface 108a (step S103), and the management information is sent from a management system interface to the application layer 107 based on the function of the management system (step S104).

In the application layer 107, the management information is received (step S105), and application programs 17, 17 . . . to be executed based on the information included in the management information are selected and executed (step S106). In the application layer 107, the execution status of the application programs 17, 17 . . . is detected (step S107), status information indicating the detected status is created (step S108), and then the created status information is outputted to the middleware layer 109 (step S109).

In the middleware layer 109, the status information outputted from the application layer 107 is received by the management system interface corresponding to the application program 17 (step S110). In the middleware layer 109, an interface is selected from the platform interface 108a so that the status information is outputted to the system manager 110 and the status information is sent (step S111).

The status information is received by the system manager 110 (step S112), and the process is completed.

When the status information is received by the system manager 110 in step S112, the system manager 110 determines an optimum status for the entire ECU 1 based on the status information, recreates management information so that an optimum process is performed in each of the application layer 107, the middleware layer 109, and the platform layer 108. Thereafter, the process from step S107 to step S112 is repeated, and the execution status in the application layer 107 is monitored by the system manager 110. Hence, for example, when the processing status in the application layer 107 has changed, optimum processes are performed in the entire apparatus, according to the change in the status.

Next, the following will explain, by giving a specific example, a process performed in the middleware layer 109 of this embodiment to select functions according to the application layer 107 and the platform layer 108.

Figure 5:
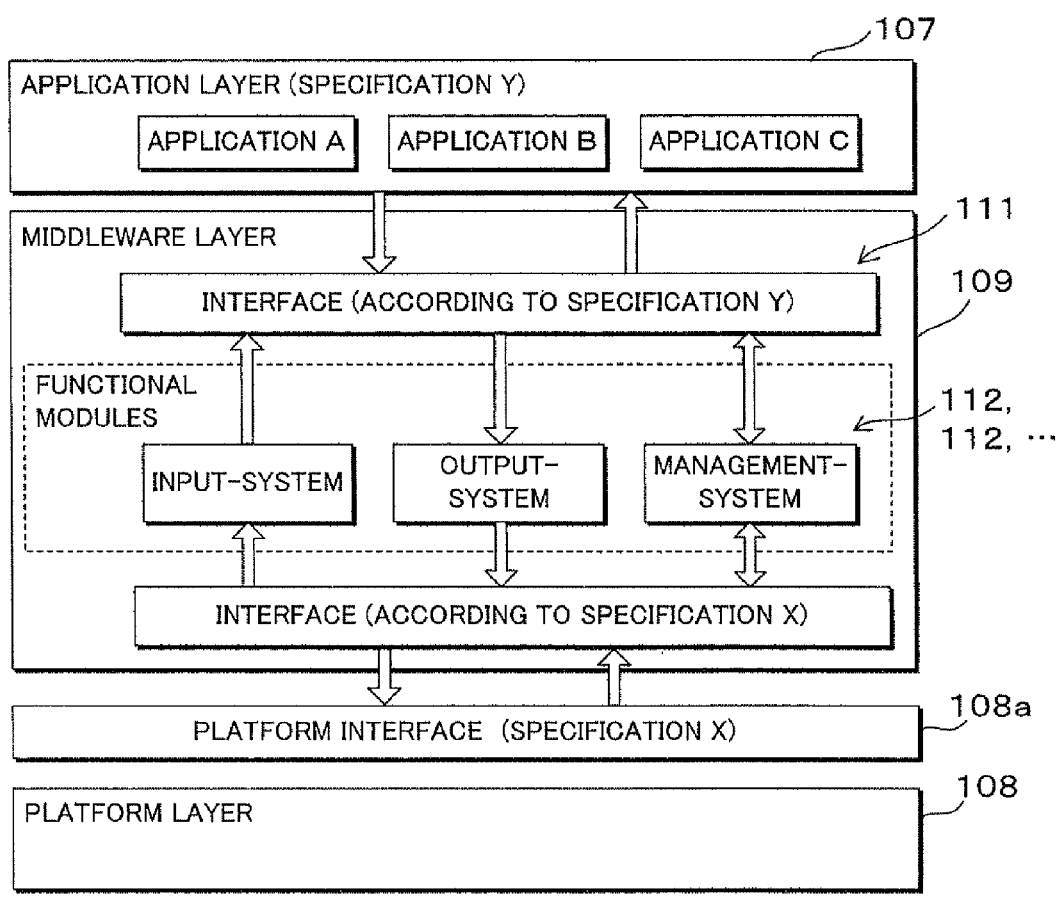
FIG. 5 is an explanatory view conceptually illustrating one example of a structure of a control program according to one combination of application programs and platform program.

FIG. 5 is an explanatory view conceptually illustrating one example of a structure of a control program 1P according to one combination of the application programs 17 and the platform program 18. In the explanatory view of FIG. 5, the platform program 18 is based on specification X, and the platform interface 108a is also configured according to the specification X. In the explanatory view of FIG. 5, the application layer 107 of the application programs 17, 17 . . . is designed and created according to specification Y. The platform interface 108a according to specification X and a calling method from the application programs 17, 17 . . . with specification Y do not correspond to each other, and therefore they are not directly combined.

However, with the software structure of the control program 1P of this embodiment, since the middleware program 19 is linked with both of them, upon linking, an interface 111 on the application layer 107 side according to specification Y of the application programs 17, 17 . . . and an interface on the platform layer 108 side according to specification X are selected and combined. Functional modules 112, 112 . . . of the input system, output system and management system corresponding to the platform layer 108 with specification X and the application layer 107 with specification Y are appropriately selected in the middleware layer 109. This enables combining the application program 17 and the platform program 18 even when specification X and specification Y are not able to be directly combined. Thus, it is not necessary to perform the process of recreating the application programs 17, 17 . . . for each specification of the platform layer 108.

Figure 6:
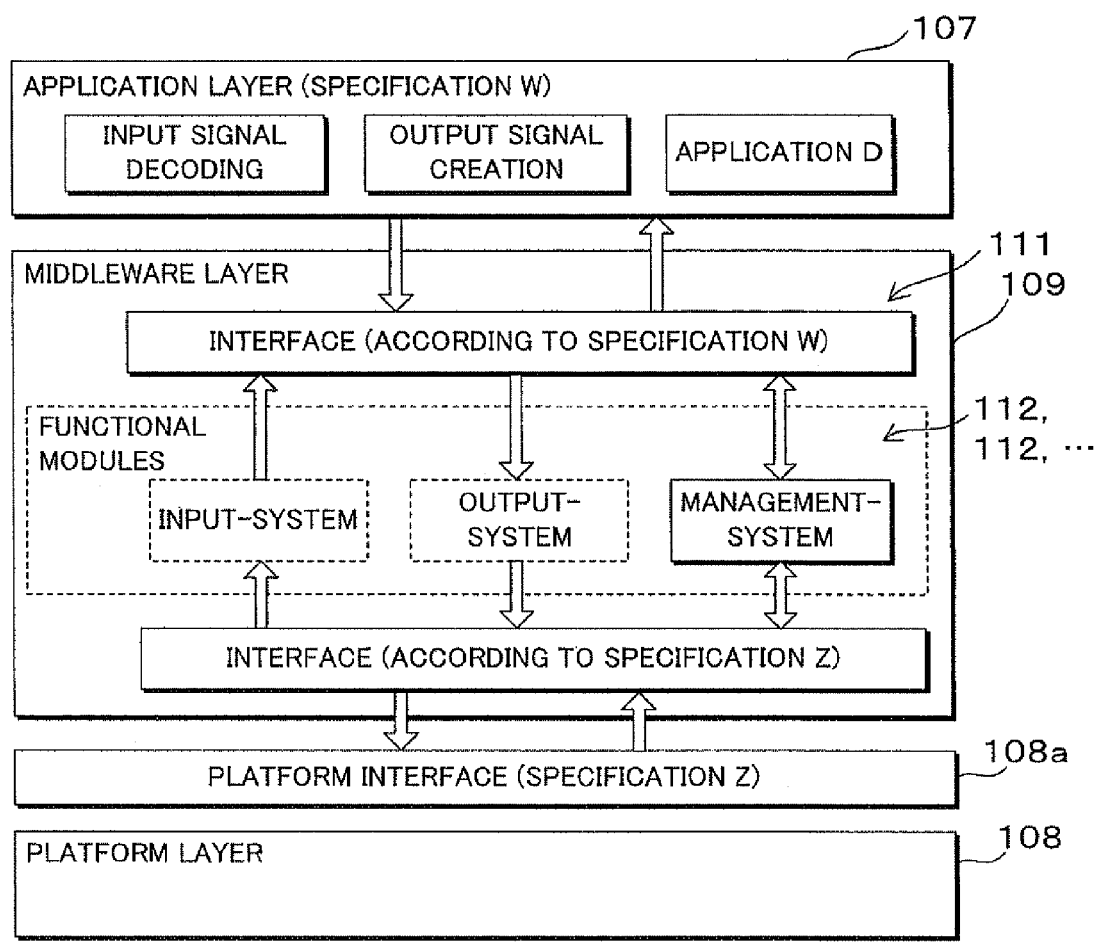
FIG. 6 is an explanatory view conceptually illustrating another example of a structure of a control program according to one combination of application programs and platform program.

FIG. 6 is an explanatory view conceptually illustrating another example of a structure of control program 1P according to one combination of application programs 17 and platform program 18. In the explanatory view of FIG. 6, the platform program 18 is based on specification Z, and the platform interface 108a is also configured according to specification Z. On the other hand, the application layer 107 of the application programs 17, 17 . . . is designed and created according to specification W. In this case, the platform interface 108a according to specification Z and the application programs 17, 17 . . . with specification W are also not combined directly.

In the example of FIG. 6, an interface 111 on the application layer 107 side according to specification W of the application programs 17, 17, . . . and an interface on the platform layer 108 side according to specification Z are selected and combined. In the application programs 17, 17, . . . with specification W, an application for decoding data (signal) inputted from the platform layer 108 and an application for creating data (signal) to be outputted are implemented, and therefore it is not necessary to perform these functions in the middleware layer 109. In this case, as illustrated in the flowchart of FIG. 3, since functional modules 112, 112 . . . are appropriately selected from the middleware program 19, only an interpreter function between the interfaces and a management system function are selected. Thus, since the functions are selectable according to a combination of application programs 17, 17 . . . and platform program 18, various combinations are available, and there is no need to perform the process of recreating the application programs 17, 17 . . . for each specification of the platform layer 108.

Figure 7:
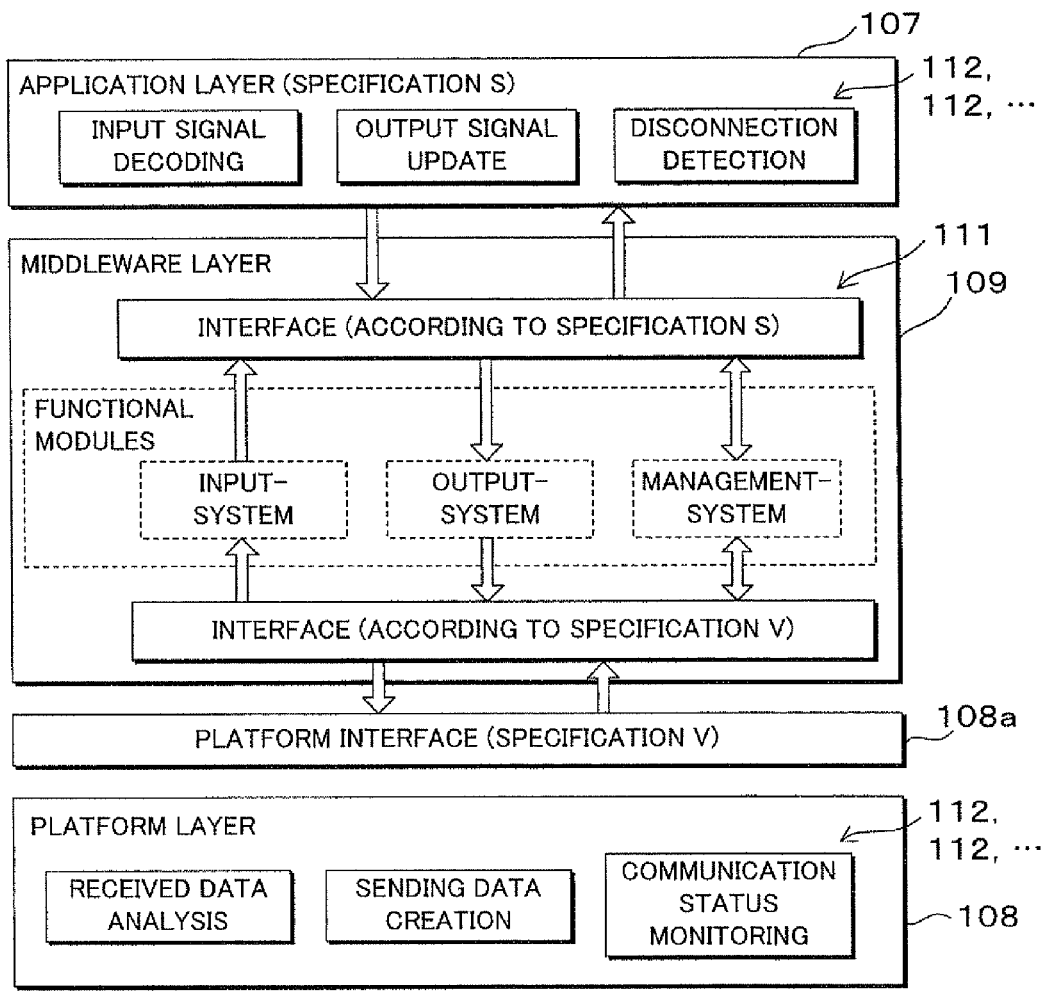
FIG. 7 is an explanatory view conceptually illustrating other example of a structure of a control program according to one combination of application programs and platform program.

FIG. 7 is an explanatory view conceptually illustrating other example of a structure of control program 1P according to one combination of application programs 17 and platform program 18. In the explanatory view of FIG. 7, the platform program 18 is based on specification V, and the platform interface 108a is also configured according to specification V. On the other hand, the application layer 107 of the application programs 17, 17 . . . is designed and created according to specification S. In this case, the platform interface 108a according to specification V and the application programs 17, 17 . . . with specification S are also not directly combined.

In the example of FIG. 7, an interface 111 on the application layer 107 side according to specification S of the application programs 17, 17, . . . and an interface on the platform layer 108 side according to specification V are selected and combined. In the combination of the platform interface 108a according to specification V and the application programs 17, 17 . . . with specification S, a function for decoding data (signal) as an input system function and a function for analyzing data received from other ECU are missing, and therefore functional modules 112, 112, . . . are selected by the process illustrated in the flowchart of FIG. 3. Moreover, as an output system function, since a function for updating output data (signal) and a function for creating data to be sent to other ECU are missing, and therefore functional modules for them are selected. Furthermore, since a function for monitoring the communication status of the communication section 15 and a function for detecting disconnection are missing, functional modules 112, 112, . . . corresponding to them are selected from the middleware program 19.

Further, in the example illustrated in FIG. 7, with the process in the flowchart of FIG. 3, the input data decoding function is determined to be executed as an application program 17 in view of the relation with other application executed in the application layer 107, for example, and functional modules 112, 112, . . . corresponding to them are selected from the middleware program 19 and placed in the application layer 107. Additionally, in the example of FIG. 7, functional modules 112, 112, . . . for the output data updating function and the disconnection detecting function are placed in the application layer 107, and functional modules 112, 112, . . . for missing functions, namely a received data analyzing function, a sending data creating function and a communication status monitoring function are selected and placed in the platform layer 108.

Thus, functions are selectable according to the application programs 17, 17 . . . and platform program 18 to be combined, and are placed according to their structures. Hence, it is possible to implement desired functions according to various combinations, and there is no need to perform the process of recreating the application programs 17, 17 . . . for each specification of the platform layer 108.

Therefore, for each platform layer 108 based on a platform program 18 created based on any specification, it is possible to combine functions in the application layer 107 based on various application programs 17, 17 . . . Any platform program 18 treats a layer above the platform interface 108a as an application layer according to its specification without discrimination, and any application programs 17, 17, . . . treat a layer below the middleware layer 109 as a platform layer 108 according to its specification without discrimination. It is therefore possible to combine the application programs 17, 17 . . . with various platform programs 18 without modifying the application programs 17, 17 . . . and use them. Hence, the reusability of the application programs 17, 17 . . . and the platform program 18 is improved.

By creating a software structure compatible with various structures of application layer 107 and platform layer 108 with the use of the middleware program 19, the ECU 1 is controllable in various combinations of application layers 107 and platform layers 108. Moreover, with a structure which enables not only absorbing either the difference in the interface on the platform layer 108 side or the difference in the calling method on the application layer 107 side, but also selecting an interface independently according to each of the interfaces for both layers, it is possible to cope with various combinations. In the case where the platform layer 108 with specification X was used, it was necessary to independently produce application programs 17, 17, . . . for specification X until now, but it becomes possible to use the application programs 17, 17 . . . with the same specification for both the platform layer 108 with specification X and the platform layer 108 with and specification Z, thereby improving the reusability of both the application programs 17, 17, . . . and the platform program 18.

In the case where a variety of processes are performed in cooperation with a plurality of ECUs, the use of a specific hardware resource is sometimes essential for some ECU. In order to use a specific hardware resource, it is necessary to use a platform program 18 specialized for the hardware resource. In the structure where each of the application programs 17, 17 . . . is individually modified according to such a platform program 18, the development period is not shortened. On the other hand, with the software structure of this embodiment, if the contents of the middleware program 19 are arranged independently to correspond to each of the specifications of the application layer 107 and the platform layer 108, it is possible to realize general-purpose software capable of performing processes according to various combinations of ECUs by a single middleware program 19, thereby achieving not only a shortening of the development period, but also advantageous effects, such as solving the complexity of program management for large-scale development.

For example, at present, each vender individually produces ECUs and ECU components, and a variety of platform programs 18 exist. However, standardization of new or existing platform layers 108 may advance, and there is a further possibility that modification or addition of platform interfaces 108a may occur thereafter. When the standardization advances, it is essential to make the application programs 17, 17 . . . correspond to the platform layer 108, and it is also necessary to modify the application programs 17, 17, . . . every time an interface is modified or added. With the software structure of control program 1P of this embodiment, however, there is no need to modify the application programs 17, 17 . . . , and it is only necessary to link the middleware program 19 again according to the standardized platform, and the middleware program 19 is still usable with other platform.

Moreover, since the middleware program 19 is composed of a plurality of separable functional modules, as illustrated in FIG. 7, functions are placed so that the functional modules are executed on the application layer 107 side, or executed on the platform layer 108 side, according to a need. Thus, in various combinations of application layers 107 and platform layers 108, it is possible to mutually compensate for missing functions. In other words, the middleware program 19 is able to work with various combinations, thereby improving the reusability of the application programs 17, 17 . . . and platform program 18.

The above-described embodiment illustrates an example in which the present invention is applied to an ECU mounted on a vehicle. However, the present invention is not limited to this, and is applicable to a computer apparatus for controlling hardware resources based on application programs.

The above-disclosed embodiment is considered to be illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A control apparatus, comprising:
a first execution section for executing one or a plurality of application programs;
a second execution section for executing a platform program for controlling an operation of a hardware resource in accordance with a request from the application program; and
a third execution section for executing a middleware program for transferring data between the application program and the platform program according to the application program and the platform program, wherein the third execution section includes a plurality of functional modules,
the middleware program corresponds to the one or plurality of application programs,
the middleware program corresponds to a plurality of interfaces for transferring data to/from each of applications and a plurality of different platform programs,
functions of the plurality of interfaces for transferring data to/from functions based on the platform programs are executed on the basis of the middleware program,
a first interface is selected that corresponds to the application program executed by the first execution section based on the one or plurality of application programs,
a second interface is selected that corresponds to the platform program executed by the second execution section based on the one or plurality of application programs,
the third execution section transfers the data with the selected first interface, the selected second interface, and a functional module selected from among the plurality of functional modules based on the one or plurality of application programs,
the third execution section includes:
for a plurality of different application programs, application associating sections for transferring data to/from the application program, respectively; and
for a plurality of different platform programs, platform associating sections for transferring data to/from the platform program, respectively,
the third execution section selects the application associating section and the platform associating section in accordance with the application program and the platform program to be executed,
with a process of the middleware program, the third execution section selects data to be sent to the application program among data from the platform program, and selects an output destination in the platform program for data when sending the data from the application program to the platform program, and
the execution of the first execution section, the second execution section, and the third execution section is performed by a processor of the control apparatus.

2. The control apparatus according to claim 1, wherein the third execution section selects the functional module from the plurality of functional modules according to the application program or the platform program, and executes the selected functional module.

3. The control apparatus according to claim 1, wherein, with a process of the middleware program, the third execution section transfers information indicating the application program to be executed by the first execution section, information identifying the application program being executed by the first execution section, or status information about the application program executed by the first execution section, to/from the first execution section or the second execution section.

4. The control apparatus according to claim 1, further comprising:
an instructing section for instructing the first execution section to execute the application program, the second execution section to execute the platform program, and the third execution section to execute the middleware program; and
a detecting section for detecting an execution status of the application program being executed by the first execution section, an execution status of the platform program being executed by the second execution section, and an execution status of the middleware program being executed by the third execution section.

5. A control apparatus, comprising:
first execution means for executing one or a plurality of application programs;
second execution means for executing a platform program for controlling an operation of a hardware resource in accordance with a request from the application program; and
third execution means for executing a middleware program for transferring data between the application program and the platform program according to the application program and the platform program, wherein
the third execution means includes a plurality of functional execution means,
the middleware program corresponds to the one or plurality of application programs,
the middleware program corresponds to a plurality of interfaces for transferring data to/from each of applications and a plurality of different platform programs,
functions of the plurality of interfaces for transferring data to/from functions based on the platform programs are executed on the basis of the middleware program,
a first interface is selected that corresponds to the application program executed by the first execution means based on the one or plurality of application programs,
a second interface is selected that corresponds to the platform program executed by the second execution means based on the one or plurality of application programs,
the third execution means transfers the data with the selected first interface, the selected second interface, and a functional execution means selected from among the plurality of functional execution means based on the one or plurality of application programs,
the third execution means includes:
 for a plurality of different application programs, application associating means for transferring data to/from the application program, respectively; and
 for a plurality of different platform programs, platform associating means for transferring data to/from the platform program, respectively,
the third execution means selects the application associating means and the platform associating means in accordance with the application program and the platform program to be executed,
with a process of the middleware program, the third execution means includes:
 means for selecting data to be sent to the application program among data from the platform program; and
 means for selecting an output destination in the platform program for data when sending the data from the application program to the platform program, and
the execution of the first execution means, the second execution means, and the third execution means is performed by a processor of the control apparatus.

6. The control apparatus according to claim 5, wherein the third execution means selects the functional execution means from the plurality of functional execution means according to the application program or the platform program, and executes the selected functional execution means.

7. The control apparatus according to claim 5, wherein, with a process of the middleware program, the third execution means includes means for transferring information indicating the application program to be executed by the first execution means, information identifying the application program being executed by the first execution means, or status information about the application program executed by the first execution means, to/from the first execution means or the second execution means.

8. The control apparatus according to claim 5, further comprising:
means for instructing the first execution means to execute the application program, the second execution means to execute the platform program, and the third execution means to execute the middleware program; and
means for detecting an execution status of the application program being executed by the first execution means, an execution status of the platform program being executed by the second execution means, and an execution status of the middleware program being executed by the third execution means.

9. A control method for controlling a hardware resource by executing one or a plurality of application programs and executing a platform program for controlling an operation of the hardware resource in accordance with a request from the application program, the method being executed by a processor of a control apparatus, the method comprising:
executing a middleware program for transferring data between the application program and the platform program according to the application program and the platform program;
selecting a function to be executed by the middleware program, according to the application program or the platform program;
transferring the data with a first interface, a second interface, and the selected function based on the one or plurality of application programs, wherein
the middleware program corresponds to the one or plurality of application programs,
the middleware program corresponds to a plurality of interfaces for transferring data to/from each of applications and a plurality of different platform programs,
functions of the plurality of interfaces for transferring data to/from functions based on the platform programs are executed on the basis of the middleware program,
the first interface is selected that corresponds to the one or plurality of application programs, and
the second interface is selected that corresponds to the platform program based on the one or plurality of application programs,
the middleware program includes:
 for a plurality of different application programs, application associating sections for transferring data to/from the application program, respectively; and
 for a plurality of different platform programs, platform associating sections for transferring data to/from the platform program, respectively,
the middleware program selects the application associating section and the platform associating section in accordance with the application program and the platform program to be executed, and
with a process of the middleware program, data to be sent to the application program among data from the platform program is selected, and an output destination in the platform program for data when sending the data from the application program to the platform program is selected.

10. A non-transitory storage medium readable by a computer and storing a computer program for causing a computer to execute transfer of data between one or a plurality of application programs and a platform program for controlling an operation of a hardware resource in accordance with a request from the application program, according to the application program and the platform program, wherein the computer program includes a plurality of program components separated into predetermined function units, causes a computer to execute a middleware program for transferring data between the application program and the platform program according to the application program and the platform program, and causes the computer to select the program component from the plurality of program components so that a function to be executed by the middleware program corresponds to the application program or the platform program, the middleware program corresponds to the one or plurality of application programs, the middleware program corresponds to a plurality of interfaces for transferring data to/from each of applications and a plurality of different platform programs, functions of the plurality of interfaces for transferring data to/from functions based on the platform programs are executed on the basis of the middleware program, a first interface is selected that corresponds to the one or plurality of application programs, a second interface is selected that corresponds to the platform program based on the one or plurality of application programs, the computer executing the middleware program transfers the data with the selected first interface, the selected second interface, and a function selected in accordance with the one or plurality of application programs, the middleware program includes:

for a plurality of different application programs, application associating sections for transferring data to/from the application program, respectively; and for a plurality of different platform programs, platform associating sections for transferring data to/from the platform program, respectively, the middleware program selects the application associating section and the platform associating section in accordance with the application program and the platform program to be executed and with a process of the middleware program, data to be sent to the application program among data from the platform program is selected, and an output destination in the platform program for data when sending the data from the application program to the platform program is selected.

* * * * *